United States Patent Office 3,102,819
Patented Sept. 3, 1963

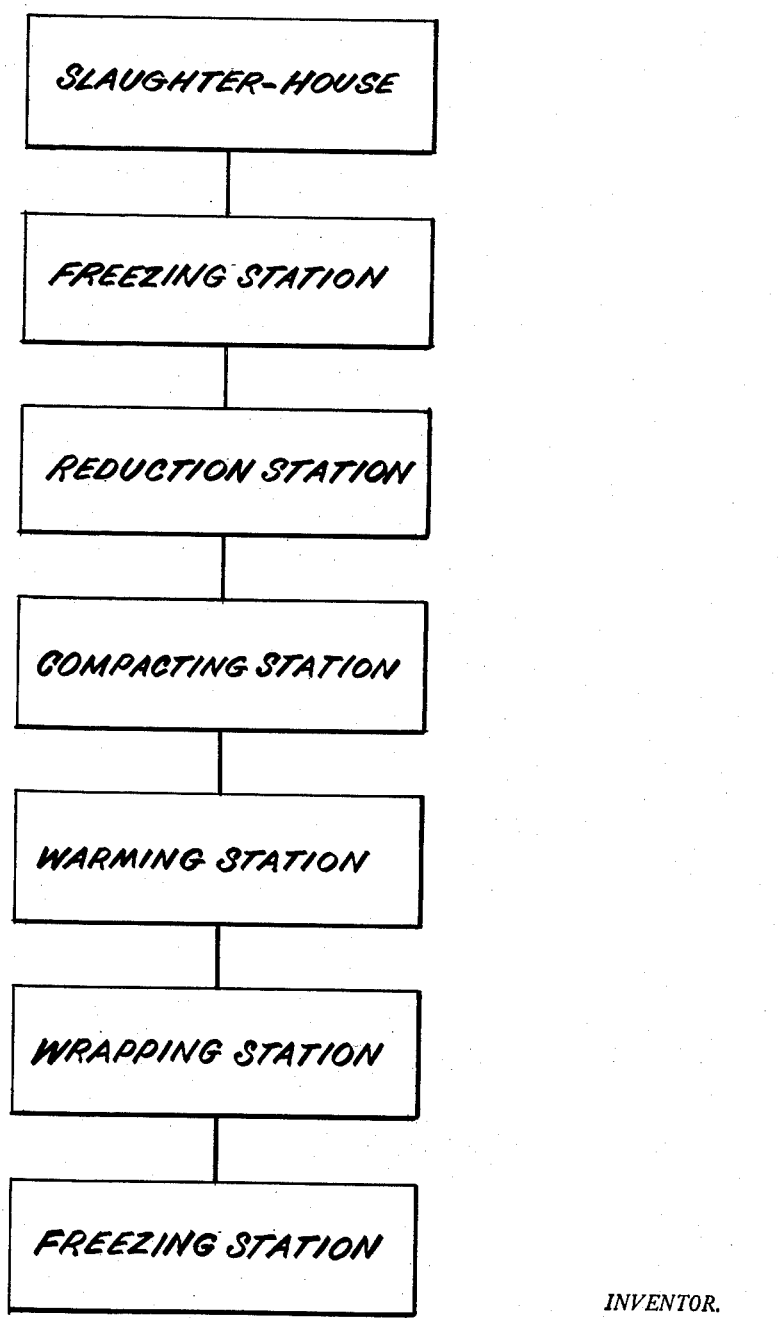

3,102,819
METHOD OF TENDERIZING MEAT
Willard L. Morrison, Lake Forest, Ill., assignor, by mesne assignments, to The Union Stock Yard and Transit Company of Chicago, Chicago, Ill., a corporation of Illinois
Filed Jan. 18, 1960, Ser. No. 3,006
9 Claims. (Cl. 99—194)

My invention relates to improvements in a tenderized meat product and method of producing it and has for one object to tenderize meat without loss of flavor.

Another object is to tenderize meat without the necessity of hanging it for long periods.

Another object is to treat raw meat to produce a pure meat product which has the physical appearance and taste of conventionally prepared meat but which without the removal of any elements of the meat has been tenderized to a point far beyond the tender chewable characteristics of usual meat products.

It is frequently the case that the tender meat cuts have a less desirable flavor than the tough cuts, the best flavor being associated with that meat which is most filled with the fibers which make it tough.

The popularity of the well known hamburger steak depends to a large extent on the fact that the tough, well flavored meat has been ground up, breaking the fibers and producing a meat product which has some of the desirable taste characteristics of the tough meat with reduced toughness.

The difficulty with the hamburger process is that grinding the meat generates heat and heat tends to expel the aromatic oils and flavors from the meat. Grinding also tends to squeeze out of the meat much of the juices and even when effort is made to save and return them to the ground meat, much is lost.

I propose to mechanically, physically break down those fibers which cause toughness but to do it without loss of essential aromas, oils and juices such as are lost in the hamburger meat grinding process.

I propose to immerse the meat as it comes from the slaughtering floor in a bath of liquid nitrogen at atmospheric pressure and —320 degrees F. for a time long enough for the meat to be frozen to the point at which it is so embrittled that it can be shattered. A temperature of —130 degrees F. is quite adequate for this purpose but no harm will be done if the temperature is lower. The time the meat must be immersed to reach the desired low temperature depends on the specific heat of the meat and the starting temperature and the weight of the meat being treated.

The specific heat can be easily determined in ways well known to the industry, the weight and temperature can be easily determined thereafter, it is easy to calculate the number of B.t.u.'s that must be extracted from the meat to obtain the desired low temperature. Knowing the number of B.t.u.'s, it is easy to determine how many liters of liquid nitrogen at —320 degrees F. must be evaporated to extract that number of B.t.u.'s from the meat. When that calculation is made, it is a simple matter to immerse the meat until the desired number of liters have been evaporated.

The meat may then be withdrawn from the bath and crushed, preferably in an atmosphere of gaseous nitrogen evaporated from the bath at substantially the boiling temperature of the gas so that during the crushing or shattering, the meat will remain at the embrittlement temperature. It may be crushed or ground, perhaps down to the fineness of thirty mesh.

This results in breaking up all the fibers, but because the temperature remains at the embrittlement point, disassociation of fiber, frozen fat, frozen blood, frozen plasma, frozen water cannot occur. The relationship in the individual particles, of the various elements of the meat remains constant. At the temperature involved, the powder or flour of meat remains dry and pulverulent.

The meat powder will then be placed in a mold and compacted into a self-sustaining slab just as other powders are compacted in the chemical, medicinal and food field. Under some circumstances this compacting is sufficient to coalesce the meat particles into a useful, merchantable meat product. Under other circumstances, the compacted meat product will be allowed to rise in temperature until it is sufficiently above the freezing point for the juices to melt, become liquid and by their colloidal properties cement or adhere the meat powder together in a coalesced meat product which has the taste, the moisture content, the juices and the appearance of untreated meat but where the meat is cemented together by the colloidal properties of the juice only, the fibers having been broken down as the result of the pulverization of the meat.

When this state is reached, the meat may be immediately used for consumption if desired, or it can be refrozen in accordance with usual frozen meat characteristics for shipment and storage at temperatures in the order of zero degrees F. or thereabout as is usually the case.

Preferably the mold in which the meat is pressed will conform in size and shape to the size of meat patty or slab which is to be marketed and preferably each mold will be lined with a metal tray or dish, perhaps of aluminum foil which can be removed from the mold with the meat.

After the meat product has been removed from the mold, the container will be sealed. It will be covered and sealed in the usual way. This may occur either before or after the meat has been warmed to a point above freezing.

Whether the meat is or is not warmed after compression it can be wrapped, shipped and stored at any temperature desired, preferably below zero degrees F.

My invention is illustrated more or less diagrammatically in the accompanying drawing, wherein is shown a flow sheet indicating the travel of the meat from the slaughter house to the warehouse. The first stage is the slaughter house where the meat is slaughtered and cut up into the desired size particles for treatment. They may be steak size. They may be roast beef size. They may be quarters or more, depending on the type of meat to be produced. The meat may be boned prior to treatment or the bones may be left in if it is desired because the bones will shatter and break at the temperatures involved just as completely as will the meat itself. From the slaughter house the meat goes to the freezer where it stays in the liquid nitrogen bath for the necessary length of time to cool it down to the desired point of embrittlement in the liquid. Meat is then conveyed from the freezing station to the pulverizing station where without substantial rise in temperature, it is broken up by any suitable crushing or breaking mechanism working in an atmosphere of the nitrogen evaporated from the freezing bath. The dry pulverulent cold meat dust then goes to the press or compacting station where the dust is formed in a suitable mold, the mold being preferably lined with the dish or tray in which the meat is to be shipped and sold. After compacting, the meat goes to the warming or heating station where it is raised in temperature up to a point above freezing at which the meat particles coalesce. The dish or tray is then covered and if desired, wrapped for storage and shipment.

Finally, in the freezing stage the coalesced meat product is frozen down to the desired temperature for storage and shipment.

Under some circumstances, the compacting or pressurizing of the powder at the low temperatures involved will be sufficient to cause the meat to coalesce without the necessity of warming it above freezing. In that case, the warming step may be omitted.

Under some circumstances the final freezing after wrapping may be omitted and wrapping may take the form merely of putting a lid on the dish or tray containing the meat or may also take the form of additional wrapping.

My tenderizing process makes it unnecessary to age the meat for tenderizing purposes but under some circumstances it is desirable to age the meat for flavor change and that may take place before or after the embrittlement treatment. In other words, the meat before embrittlement can be aged or the meat product after embrittlement and compacting may be aged.

The shape of the final product depends altogether on the type of market for which it is intended. It may be shaped to look like a hamburger patty. It may be shaped to look like a steak. It may be compacted to look like a roast.

Marbling, that is the lines of fat distributed throughout the meat is desirable and makes meat more valuable, not only because of its tenderizing effect but also because of the flavor. If desired, when lean meat is treated by my method, additional fat may be similarly treated and powdered and mixed with the lean meat powder so as to give the flavor characteristic of marbling.

The meat will normally be taken from station to station under such conditions that there is no temperature change between stations and under such conditions that the atmosphere to which the meat is exposed is either a nitrogen atmosphere or if other cooling is used, an atmosphere having a minimum oxidizing effect.

I claim:
1. The method of tenderizing freshly slaughtered meat which consists in cooling it by immersion in a bath of liquid nitrogen at atmospheric pressure and −320 degrees F. down to a temperature in the order of −130 degrees F. at which the meat is embrittled, then without substantial rise in temperature, pulverizing the meat in a gaseous nitrogen atmosphere to a fineness in the order of 30 mesh, then molding the meat under pressure to coalesce the meat powder into a self-sustaining slab, raising the temperature of the slab to a point above freezing at which the colloidal action of the meat juices cement the powder together to additionally coalesce the slab, then freezing the slab again to a point in the order of zero degrees F. for storage and shipment.

2. The method of tenderizing freshly slaughtered meat which consists in cooling it down to a temperature at which the meat is so embrittled that it will shatter under impact, then without substantial rise in temperature pulverizing the meat, then molding the meat powder under pressure to coalesce it into a self-sustaining slab.

3. The method of tenderizing freshly slaughtered meat which consists in cooling it down to a temperature at which the meat is so embrittled that it will shatter under impact, then without substantial rise in temperature pulverizing the meat, then molding the meat powder under pressure to coalesce it into a self-sustaining slab, then raising the temperature of the slab to a point above freezing at which the colloidal action of the meat juices cement and additionally coalesce the slab.

4. The method of tenderizing freshly slaughtered meat which consists in cooling it down to a temperature at which the meat is so embrittled that it will shatter under impact, then without substantial rise in temperature pulverizing the meat, then molding the meat powder under pressure to coalesce it into a self-sustaining slab, then raising the temperature of the slab to a point above freezing at which the colloidal action of the meat juices cement and additionally coalesce the slab, then freezing the slab again to a point below zero degrees F. for storage and shipment.

5. The method of tenderizing freshly slaughtered meat which consists in cooling it down to a temperature in the order of −130 degrees F. at which the meat is so embrittled that it will shatter under impact, then without substantial rise in temperature pulverizing the meat, then molding the meat powder under pressure to coalesce it into a self-sustaining slab.

6. The method of tenderizing freshly slaughtered meat which consists in cooling it down to a temperature at which the meat is so embrittled that it will shatter under impact, then without substantial rise in temperature pulverizing the meat to a fineness in the order of thirty mesh, then molding the meat powder under pressure to coalesce it into a self-sustaining slab.

7. The method of tenderizing freshly slaughtered meat which consists in cooling it down to a temperature in the order of −130 degrees F. at which the meat is so embrittled that it will shatter under impact, then without substantial rise in temperature pulverizing the meat to a fineness in the order of thirty mesh, then molding the meat powder under pressure to coalesce it into a self-sustaining slab.

8. The method of tenderizing freshly slaughtered meat which consists in cooling it by immersion in a bath of liquid nitrogen at atmospheric pressure and −320 degrees F. down to a temperature at which the meat is so embrittled that it will shatter under impact, then without substantial rise in temperature, pulverize the meat, then molding the meat powder under pressure to coalesce it into a self-sustaining slab.

9. The method of tenderizing freshly slaughtered meat which consists in cooling it by immersion in a bath of liquid nitrogen at atmospheric pressure and −320 degrees F. down to a temperature at which the meat is so embrittled that it will shatter under impact, then without substantial rise in temperature, pulverize the meat, then molding the meat powder under pressure to coalesce it into a self-sustaining slab, the pulverizing and molding of the meat taking place in a gaseous nitrogen atmosphere.

References Cited in the file of this patent

UNITED STATES PATENTS

| | | |
|---|---|---|
| 2,059,970 | Robillard | Nov. 3, 1936 |
| 2,583,697 | Hendry et al. | Jan. 29, 1952 |
| 2,831,329 | Morrison | Apr. 22, 1958 |
| 2,852,395 | Gaumer | Sept. 16, 1958 |